(12) United States Patent
Choy et al.

(10) Patent No.: US 6,780,912 B2
(45) Date of Patent: Aug. 24, 2004

(54) ADDITION OF METAL IONS TO IMPROVE LIGHTFASTNESS OF INKJET INKS

(75) Inventors: Mark L. Choy, San Diego, CA (US); Richard Anderson, Escondido, CA (US)

(73) Assignee: Hewlett-Packard Development Company L.P., Houston, TX (US)

(*) Notice: Subject to any disclaimer, the term of this patent is extended or adjusted under 35 U.S.C. 154(b) by 0 days.

(21) Appl. No.: 09/794,883

(22) Filed: Feb. 26, 2001

(65) Prior Publication Data

US 2002/0165293 A1 Nov. 7, 2002

(51) Int. Cl.$^7$ ................................................ C08K 3/10
(52) U.S. Cl. ...................... 524/403; 524/406; 524/407; 524/413; 524/434; 524/555; 524/612
(58) Field of Search ................................ 524/403, 406, 524/407, 413, 434, 555, 612

(56) References Cited

U.S. PATENT DOCUMENTS

| | | | |
|---|---|---|---|
| 5,695,820 A | 12/1997 | Davis et al. | |
| 6,132,021 A | 10/2000 | Smith et al. | |
| 6,153,001 A | 11/2000 | Suzuki et al. | |
| 6,244,687 B1 | 6/2001 | Gast et al. | |
| 6,261,350 B1 | 7/2001 | Kabalnov | |
| 6,315,392 B1 | 11/2001 | Kinas et al. | |
| 6,342,094 B1 | 1/2002 | Kabalnov | |
| 6,354,693 B1 | 3/2002 | Looman et al. | |
| 6,386,695 B1 | 5/2002 | Kowalski | |
| 6,412,935 B1 | 7/2002 | Doumaux | |
| 6,443,568 B1 | 9/2002 | Askeland et al. | |
| 6,450,632 B1 | 9/2002 | Tsang et al. | |
| 6,464,334 B2 | 10/2002 | Lopez et al. | |
| 6,488,368 B2 | 12/2002 | Peterson et al. | |

FOREIGN PATENT DOCUMENTS

| | | |
|---|---|---|
| EP | 1022151 A1 | 7/2000 |
| EP | 1077239 A1 | 2/2001 |

OTHER PUBLICATIONS

"CRC Handbook of Chemistry and Physics", 63rd ed. (pb99) (1982).*

* cited by examiner

Primary Examiner—Edward J. Cain

(57) ABSTRACT

An additive for a fixer for inkjet printing. A metal salt is added to the fixer formulation to increase lightfastness of the printed ink.

24 Claims, No Drawings

ADDITION OF METAL IONS TO IMPROVE LIGHTFASTNESS OF INKJET INKS

FIELD OF THE INVENTION

This invention pertains to inkjet ink formulations having increased lightfastness, and, more particularly, to the addition of divalent metal ions to inks to improve lightfastness.

BACKGROUND OF THE INVENTION

Various fixers may be printed on top of inks to increase physical durability of the printed dye on a medium. While these fixers increase the waterfastness and smudgefastness of the inks, they may decrease their lightfastness, resulting in accelerated fading. While lightfastness may be improved by changing the ink formulation, there might be severe compromises for other properties such as color gamut and pen nozzle health. Alternatively, the fixer formulations may be modified. Typical fixers rely on cationic polymers such as poly(ethylene imine) (PEI), but these polymers may not improve lightfastness while maintaining printing reliability of the fixer and physical stability of the printed ink. Thus, it is desirable to have a method of reducing the negative impact of fixer formulations on lightfastness while maintaining their other desirable properties.

SUMMARY OF THE INVENTION

In one aspect, the invention is an additive for a fixer formulation for inkjet printing. The additive is a metal salt, and the fixer formulation should include a positively charged polymer. The metal salt may include a divalent metal ion, such as Cu, Co, Ni, Ti, Pt, Pd, Cd, V, Cr, Hg, or Mn. The salt may also include an anion such as $Cl^-$, $Br^-$, $SO_4^{2-}$, $CH_3CO_2^-$, $PO_4^{3-}$, or $NO_3^-$. The metal salt may be a hydrate, and the positively charged polymer may comprise a quaternary nitrogen atom or a nitrogen atom that has been rendered cationic through protonation. Appropriate polymers include poly(ethylene imine) or methylated poly(ethylene imine).

DETAILED DESCRIPTION

The invention improves the lightfastness of printed inks by adding a metal ion such as divalent copper to a fixer for an inkjet printer. In a typical inkjet printer, cyan, magenta, yellow, and black inks are printed on a medium in a predetermined pattern. A fixer is printed over or under the inks to immobilize them. A positively charged polymer such as PEI or methylated PEI in the fixer immobilizes the negatively charged dye in the ink through electrostatic interactions. Other polymers with quaternary nitrogen atoms or that have nitrogen atoms that can be rendered cationic are also employed to immobilize the dye. However, other chemical interactions between the positively charged nitrogen and the dyes may cause the colorant to fade. Addition of a metal to the fixer may improve the lightfastness of the dye-fixer complex while allowing the electrostatic interactions that increase waterfastness and minimizing other, detrimental, chemical reactions.

In addition to copper, other cations may be employed as well. For example, $Co^{2+}$, $Ni^{2+}$, $Ti^{2+}$, $Pt^{2+}$, $Pd^{2+}$, $Cd^{2+}$, $Mn^{2+}$, $V^{2+}$, $Cr^{2+}$, and $Hg^{2+}$ may be added to the fixer. Any anion derived from a strong acid may be employed as a counter-ion for the metal, which is added to the fixer as a salt. Exemplary counter-ions include but are not limited to $Cl^-$, $Br^-$, $SO_4^{2-}$, $CH_3CO_2^-$, $PO_4^{3-}$, and $NO_3^-$. The fixer itself should have a pH between 4 and 9.

EXAMPLE

Copper was added as $Cu(NO_3)_2 \cdot 2.5H_2O$ to a standard fixer formulation at 25:1 and 5:1 mole ratios with PEI. An exemplary fixer formulation includes 0.05% TINULUX™ BBS (14% solid), a dye available from Ciba Specialty Chemicals, 10.0% 1,5-pentanediol, 4.0% pyrrolidinone, 6.0% tetraethylene glycol, 3.5% LIPOSOL™ G (PEI, MW ~700), available from BASF, 1.25% TERGITOL™ 15-S-5, an alkyl polyethylene oxide surfactant produced by Union Carbide, 0.7% BIOTERGE™ PS-8s (35% active), a alpha olefin sulfonate surfactant available from Stepan Co., and 3.5% calcium nitrate and has a pH=4.

The enhanced fixer was tested in conjunction with the standard color inks used in the Hewlett Packard 2000C series printers. The optical density of the printed ink was measured using a X-Rite Model 938 Spectrodensitometer. An OD of 1 corresponds to 90% absorption. The scale is logarithmic; 99% absorption gives an optical density of 2. Lightfastness can be measured by %OD loss after exposure to light. The fixer was printed under the ink at approximately a 1:1 drop volume ratio. The fixer pen was taped to generate a "no fixer" control group. The printer was adjusted to print a pattern with an OD of either 0.5 or 1.0 and the %OD loss measured after simulation of 1 year of indoor fading. The effects of the improved fixer on lightfastness were tested on both Champion DATA COPY™ (CDC) and HAMMERMILL FORE™ DP (HMFD) papers (Table 1).

TABLE 1A

% OD Loss From Champion DATA COPY ™ Paper Printed at 0.5 OD and 1.0 OD After One Year Simulated Indoor Fade

| Fixer | % OD Loss | | | | | |
|---|---|---|---|---|---|---|
| | Cyan | | Magenta | | Yellow | |
| Composition | 0.5 OD | 1.0 OD | 0.5 OD | 1.0 OD | 0.5 OD | 0.7 OD |
| No fixer | 21.1 | 20.5 | 17.3 | 9.2 | 10.6 | 7.0 |
| Plain fixer | 38.2 | 24.3 | 20.9 | 9.6 | 21.7 | 14.3 |
| Fixer + 25:1 Cu/PEI | 21.6 | 18.5 | 14.8 | 7.5 | 8.8 | 5.2 |
| Fixer + 5:1 Cu/PEI | 33.1 | 20.3 | 16.4 | 10.0 | 21.5 | 13.8 |

TABLE 1B

% OD Loss From HAMMERMILL FORE ™ DP Paper Printed at 0.5 OD and 1.0 OD After One Year Simulated Indoor Fade

| Fixer | % OD Loss | | | | | |
|---|---|---|---|---|---|---|
| | Cyan | | Magenta | | Yellow | |
| Composition | 0.5 OD | 1.0 OD | 0.5 OD | 1.0 OD | 0.5 OD | 0.7 OD |
| No fixer | 21.0 | 17.1 | 21.0 | 9.1 | 13.1 | 4.7 |
| Plain fixer | 38.3 | 25.2 | 22.1 | 12.9 | 25.2 | 12.3 |
| Fixer + 25:1 Cu/PEI | 24.1 | 14.5 | 9.6 | 4.8 | 13.7 | 10.3 |
| Fixer + 5:1 Cu/PEI | 32.4 | 22.4 | 15.8 | 8.0 | 21.3 | 10.8 |

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A fixer formulation for inkjet printing, comprising:
   a metal salt, and
   an aqueous solution of a positively charged polymer.

2. The fixer formulation of claim 1, wherein the metal salt comprises a divalent metal ion.

3. The fixer formulation of claim 2, wherein the metal ion comprises a member of Cu, Co, Ni, Ti, Pt, Pd, Cd, V, Hg, Cr, and Mn.

4. The fixer formulation of claim 3, wherein the metal ion comprises divalent copper.

5. The fixer formulation of claim 1, wherein the metal salt comprises a member of $Cl^-$, $Br^-$, $SO_4^{2-}$, $CH_3CO_2^-$, $PO_4^{3-}$, or $NO_3^-$.

6. The fixer formulation of claim 1, wherein the metal salt comprises a hydrate.

7. The fixer formulation of claim 1, wherein the positively charged polymer comprises a member of a quaternary nitrogen atom and a nitrogen atom that has been rendered cationic through protonation.

8. The fixer formulation of claim 7, wherein the polymer comprises poly(ethylene imine) or methylated poly(ethylene imine).

9. A method for preparing a fixer formulation for inkjet printing comprising steps of:
   dissolving a positively charged polymer in an aqueous solvent or solution; and
   dissolving a metal salt in the same solvent or solution.

10. The method of claim 9, wherein the metal salt comprises a divalent metal ion.

11. The method of claim 10, wherein the metal ion comprises a member of Cu, Co, Ni, Ti, Pt, Pd, Cd, V, Hg, Cr, and Mn.

12. The method of claim 11, wherein the metal ion comprises divalent copper.

13. The method of claim 9, wherein the metal salt comprises a member of $Cl^-$, $Br^-$, $SO_4^{2-}$, $CH_3CO_2^-$, $PO_4^{3-}$, or $NO_3^-$.

14. The method of claim 9, wherein the metal salt comprises a hydrate.

15. The method of claim 9, wherein the positively charged polymer comprises a member of a quaternary nitrogen atom and a nitrogen atom that has been rendered cationic through protonation.

16. The method of claim 15, wherein the polymer comprises poly(ethylene imine) or methylated poly(ethylene imine).

17. A fixer formulation for inkjet printing prepared by a method comprising steps of:
   dissolving a positively charged polymer in an aqueous solvent or solution; and
   dissolving a metal salt in the same solvent or solution to form the fixer.

18. The fixer formulation of claim 17, wherein the metal salt comprises a divalent metal ion.

19. The fixer formulation of claim 18, wherein the metal ion comprises a member of Cu, Co, Ni, Ti, Pt, Pd, Cd, V, Hg, Cr, and Mn.

20. The fixer formulation of claim 19, wherein the metal ion comprises divalent copper.

21. The fixer formulation of claim 17, wherein the metal salt comprises a member of $Cl-$, $Br-$, $SO_4^2-$, $CH_3CO_2-$, $PO_4^3-$, and $NO_3-$.

22. The fixer formulation of claim 17, wherein the metal salt comprises a hydrate.

23. The fixer formulation of claim 17, wherein the positively charged polymer comprises a member of a quaternary nitrogen atom and a nitrogen atom that has been rendered cationic through protonation.

24. The fixer formulation of claim 23, wherein the polymer comprises poly(ethylene imine) or methylated poly(ethylene imine).

* * * * *

UNITED STATES PATENT AND TRADEMARK OFFICE
CERTIFICATE OF CORRECTION

PATENT NO. : 6,780,912 B2
DATED : August 24, 2004
INVENTOR(S) : Choy et al.

It is certified that error appears in the above-identified patent and that said Letters Patent is hereby corrected as shown below:

Column 4,
Line 26, delete "Cl—, Br—, $SO_4^2$—," and insert therefor -- $Cl^-$, $Br^-$, $SO_4^{2-}$, --
Line 27, delete "$CH_3CO_2$—, $PO_4^3$—, and $NO_3$—." and insert therefor -- $CH_3CO_2^-$, $PO_4^{3-}$, and $NO_3^-$. --

Signed and Sealed this

Fifth Day of April, 2005

JON W. DUDAS
*Director of the United States Patent and Trademark Office*